(12) United States Patent
Coulson (10) Patent No.: US 8,630,377 B2
(45) Date of Patent: Jan. 14, 2014

(54) DETECTION OF WIDEBAND INTERFERENCE

(75) Inventor: Alan James Coulson, Lower Hutt (NZ)

(73) Assignee: Industrial Research Limited, Lower Hutt (NZ)

( * ) Notice: Subject to any disclaimer, the term of this patent is extended or adjusted under 35 U.S.C. 154(b) by 1179 days.

(21) Appl. No.: 12/520,682

(22) PCT Filed: Dec. 21, 2007

(86) PCT No.: PCT/NZ2007/000393
§ 371 (c)(1),
(2), (4) Date: Jun. 22, 2009

(87) PCT Pub. No.: WO2008/075988
PCT Pub. Date: Jun. 26, 2008

(65) Prior Publication Data
US 2010/0014616 A1    Jan. 21, 2010

(30) Foreign Application Priority Data
Dec. 21, 2006  (NZ) ........................................ 552270

(51) Int. Cl.
*H04L 27/08*   (2006.01)
(52) U.S. Cl.
USPC ........... 375/341; 375/262; 375/227; 375/350; 375/349; 375/346; 375/E1.028; 375/E1.024; 375/E1.036; 714/794; 714/795
(58) Field of Classification Search
USPC ................. 375/262, 227, 350, 349, 341, 346, 375/E1.028, E1.024, E1.036; 714/794, 795
See application file for complete search history.

(56) References Cited

U.S. PATENT DOCUMENTS 7,577,446 B2 *  8/2009  Guvenc et al. ............. 455/456.2

OTHER PUBLICATIONS

David Makovoz "noise variance estimation in signal processing" 2006 IEEE international symposium of signal processing and information technology,pp. 365-369;Aug. 2006.*
Flury et al. "interference mitigation by statistical interference modeling in impulse radio UWB receiver"; Ultra-wideband,2006 IEEE international conference;pp. 393-398,Sep. 2006.*
International Search Report dated Jun. 27, 2009 of International Application No. PCT/NZ07/00393.
Cui, T. et al., "Generalized Feedback Detection for Spatial Multiplexing Multi-Antenna Systems", IEEE Transactions on Wireless Communications, vol. 7, No. 2, Feb. 2008, pp. 594-603.
Pan, Z. et al., "Subvector-Based Fast Encoding Method for Vector Quantization Without Using Two Partial Variances", Optical Review, vol. 13, No. 6 (2006) Aug. 9, 2006, pp. 410-416 (Abstract Only).
O'Sullivan, J.A. et al., "Method of Reducing Dimensionality in ATR Systems", Electronic Systems and Signals Research Laboratory, Department of Electrical Engineering, Washington University, Aug. 2000, pp. 1-12.

* cited by examiner

*Primary Examiner* — Daniel Washburn
*Assistant Examiner* — Rahel Guarino
(74) *Attorney, Agent, or Firm* — Dann, Dorfman, Herrell and Skillman, P.C.

(57) ABSTRACT

A method of detecting interference in a received sample vector using hidden Markov modelling by first estimating noise variance, where estimating noise variance comprises the steps of receiving a sample vector of noise and interference, sorting the sample vector in the frequency domain by order of increasing magnitude to produce an ordered vector, finding a sub-vector of the ordered vector that minimizes the distance from a noise measure, and estimating the noise variance.

10 Claims, 9 Drawing Sheets

DETECTION OF WIDEBAND INTERFERENCE

FIELD OF INVENTION

The present invention is a method and system of estimating noise power and detecting interference with particular application to cognitive radio systems.

BACKGROUND

Radio spectrum is typically allocated by Government organisations. Portions of the radio spectrum are licensed to users for particular use. For example AM and FM radio bands are licensed to different radio service providers. Unlicensed users of spectrum are generally tracked down and stopped from using licensed portions of the spectrum. Some areas of the spectrum are unlicensed and provide a free for all for any number of users. Examples of unlicensed spectrum include the spectrum in which baby monitors, garage door openers and cordless telephones operate; this is the 2.4 GHz ISM band.

One of the inefficiencies of licensing radio spectrum is that inefficient use is made of the licensed spectrum. With a spectrum license to a radio station, only that radio station can use its licensed portion of spectrum. It may be possible for other users to use the same spectrum without causing interference to the licensed party but under the current licensing terms, this is not allowed.

The commercial success of unlicensed spectrum is leading to developments in which many wireless users can operate in the same frequency band and share the spectrum. Some existing systems to allow this include dynamic frequency selection and transmit power control. These new concepts have lead to a new smart wireless system called cognitive radio. An important aspect of cognitive radio behaviour is the ability to reliably detect the present of interference from other systems for competing spectrum use. This is necessary both in the cognitive radio receiver to protect the integrity of the wanted signal and also on the cognitive radio transmitter, which must avoid producing interference on other systems. At the receiver, robust interference detection allows the system to identify which channels or bands should be avoided. Further, where the system in question is broadband, the interference is relatively narrow, it is possible for the system to co-exist in the same spectrum as the interfering system with minimal disruption to either system.

Interference can either be wideband or narrowband. Detection of narrowband interference is based on well established principles including maximum likelihood estimation, exploiting the inherent cyclostationarity of narrowband signals. However, as more wideband communication systems are developed and standardised, interference increasingly occurs between wideband systems. In this interference the spectral use of one system may fully or partially overlap the spectral use of another system. While some wideband modulations such as orthogonal frequency division multiplexing exhibit cyclostationarity, wideband systems are not inherently cyclostationary. Wideband interference detection must be based primarily on received power spectrum density. Moreover, where wideband interference occurs between heterogeneous systems, each cognitive radio receiver must either view the receiver signal of the others as being generated by an unknown stochastic process or else incorporate a full physical layer receiver for each interfering system. Some existing systems use an FFT to determine the power in each frequency bin. If the power is more than a threshold value, the detector determines that there is interference. This method is a simple interference temperature method. Another proposed system is to use a control channel common to all users of the spectrum. The control channel will provide information on the spectral usage of each user. However, such a system relies on different manufacturers all agreeing to the same protocols and frequency for the control channel. The control channel system avoids finding and suppressing interference. In the worse case, the system is completing blind to any interferers; the interferers are wideband with unknown frequency and unknown statistics.

SUMMARY OF INVENTION

It is the object of the present invention to provide an alternative method of estimating noise variance and method of detecting wideband interference, or to at least provide the public with a useful choice.

In broad terms in one aspect the invention comprises a method of estimating noise variance comprising the steps of receiving a sample of noise and interference, sorting the sample in the frequency domain by order of increasing magnitude to produce an ordered vector, finding a sub-vector of the ordered vector that minimises the distance from a noise measure, and estimating the noise variance.

Preferably the sub-vector is found as $$\hat{\vec{X}}_Z \triangleq [\vec{X}_1 \ldots \vec{X}_{N_Z}]$$

where $\hat{\vec{X}}_Z$ is the sub-vector and $\vec{X}_1 \ldots \vec{X}_{N_Z}$ are elements of the sub-vector.

In one embodiment the sub-vector is found as the vector that minimises the distance from Gaussianity, such that $$\hat{N}_Z = \underset{N_Z}{\operatorname{argmin}} D(\vec{X}_{N_Z})$$

where $D(\bullet)$ is some measure of Gaussianity. The measure of Gaussianity may by kurtosis or the Kolmogorov-Smirnov distance. If the Kolmogorov-Smirnov distance is used the real and imaginary parts of X can be evaluated from Gaussian, the distance of $|X|$ from Rayleigh or the distance of $|X|^2$ from exponential can be evaluated.

In broad terms in another aspect the invention comprises a method of detecting interference comprising the steps of receiving a sample vector X of noise and interference, finding a set of parameters that maximise $p(X|T,P,I)$ where T is the transition probability between states, P is the observation probability and I is the initial state, determining a state sequence from the set of parameters and determining wideband interference from the state sequence.

In one embodiment the step of finding a set of parameters that maximise $p(X|T,P,I)$ includes the step of estimating noise variance. Noise variance can be estimated using a number of techniques including receiving a sample vector of noise and interference, sorting the sample vector in the frequency domain by order of increasing magnitude to produce an ordered vector, finding a sub-vector of the ordered vector that minimises the distance from a noise measure, and estimating the noise variance.

The step of finding a set of parameters that maximise $p(X|T,P,I)$ may further comprise the steps of producing a nominal interference variance and initialising a state sequence.

Preferably the nominal interference variance may be found as $\hat{\sigma}_I^2 \triangleq r\hat{\sigma}_Z^2$ where $\hat{\sigma}_I^2$ is the interference variance r is a threshold value and $\hat{\sigma}_Z^2$ is the noise variance.

Preferably the optimal state sequence is found as $$\mathcal{S} = \arg\max_{\mathcal{S}} \ p(X \mid \mathcal{S}, \mathcal{P}, \mathcal{T}, \mathcal{I}) p(\mathcal{S} \mid \mathcal{P}, \mathcal{T}, \mathcal{I}).$$

In one embodiment the optimal state sequence is produced using the Viterbi algorithm.

The term "comprising" as used in this specification and claims means "consisting at least in part of". That is to say, when interpreting statements in this specification and claims which include "comprising", the features prefaced by this term in each statement all need to be present but other features can also be present. Related terms such as "comprise" and "comprised" are to be interpreted in a similar manner.

BRIEF DESCRIPTION OF DRAWINGS

The invention will be further described by way of example only and without intending to be limiting with reference to the following drawings, wherein.

DETAILED DESCRIPTION

Figure 1:
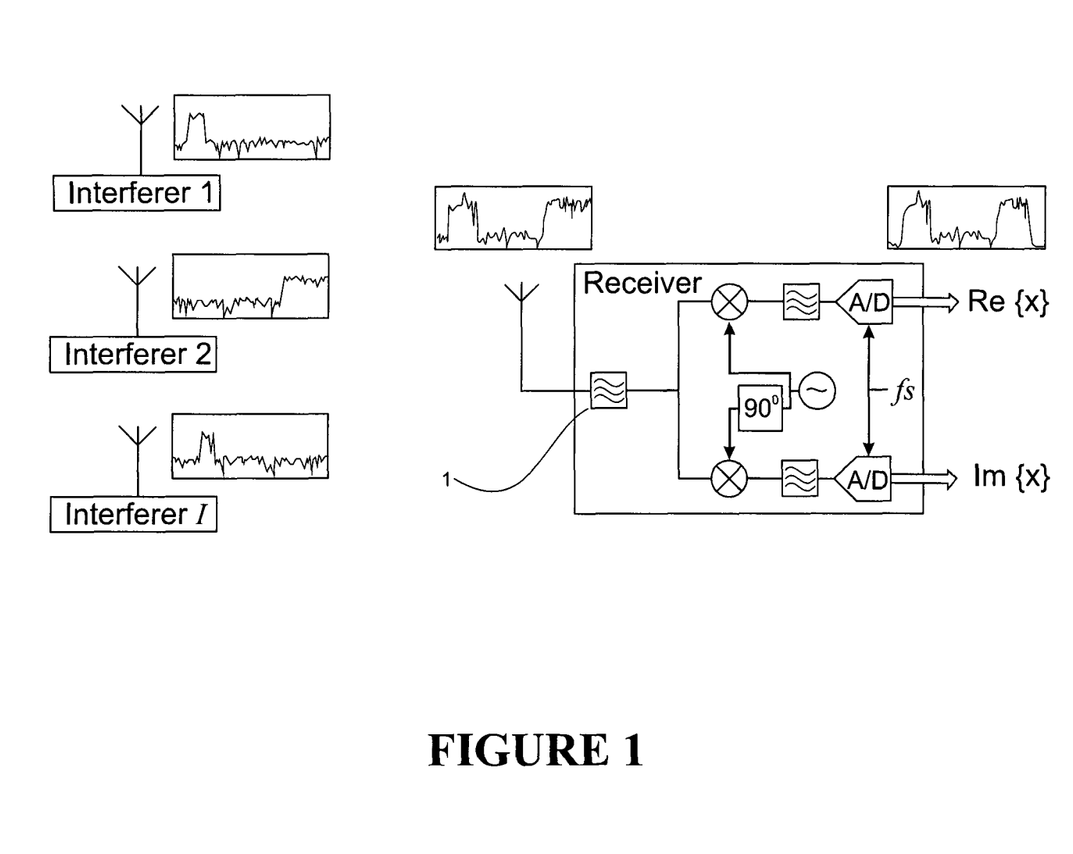
FIG. 1 shows a receiver system.

FIG. 1 shows a conventional receiver structure. The received signal is bandlimited to the approximate desired signal bandwidth B by band pass filter 1. The bandlimited signal is down-converted to baseband and complex samples are obtained at a rate $f_s \geq B$ sufficient to prevent aliasing of the desired signal. Initial detection of interferers takes place during a time-limited signal-free period such as an N sample inter-frame space. Thus, the receiver obtains a column vector of N signal samples $$x = \sum_{i=1}^{I} h_i s_i + z \qquad 1$$

where $s_i$ is the N length vector representing the ith interferer experiencing N×N circulant fading channel matrix $h_i$ and z is additive white Gaussian noise (AWGN) having variance $\sigma_z^2$ per sample. Application of the N×N discrete Fourier transform (DFT) matrix D to x produces $$X = Dx = \sum_{i=1}^{I} H_i S_i + Z \qquad 2$$

where $H_i$ is the diagonal N×N channel transfer function matrix for the ith interferer, $S_i$ is the N length DFT of $s_i$ and Z is the DFT of AWGN vector z having both real part $Z^R \triangleq \mathrm{Re}\{Z\}$ and imaginary part $Z^I \triangleq \mathrm{Im}\{Z\}$ distributed according to the Gaussian probability density function (PDF)

$$p_Z(Z^R) \triangleq \frac{1}{\sqrt{2\pi}\,\sigma_Z} \exp\left(-\frac{1}{2}\left[\frac{Z^R}{\sigma_Z}\right]^2\right) \triangleq \prod_{n=1}^{N} \frac{1}{\sqrt{2\pi}\,\sigma_Z} \exp\left(-\frac{1}{2}\left[\frac{Z_n^R}{\sigma_Z}\right]^2\right), \qquad 3$$

where $\sigma_Z^2$ is the frequency domain dual of $\sigma_z^2$.

The joint PDF of the real and imaginary parts of the noise is $$p_Z^J(Z) \triangleq p_Z(Z^R, Z^I) = p_Z(Z^R) p_Z(Z^I) = \frac{1}{2\pi\sigma_Z^2} \exp\left(-\frac{|Z|^2}{2\sigma_Z^2}\right) \qquad 4$$

and the noise magnitude PDF is $$P_Z^M(|Z|) = \frac{|Z|}{\sigma_Z^2} \exp\left(-\frac{|Z|^2}{2\sigma_Z^2}\right). \qquad 5$$

The following four assumptions are made concerning the interference.

1. The duration of the received sample x is sufficiently short that all interference is present or absent in every time sample (vector element) and that H is not time-varying.

2. The ith interferer $s_i$ is strictly bandlimited such that $$\langle |S_{i,n}|^2 \rangle = \begin{cases} \sigma_i^2, & n \in k_i \triangleq [a_i \ \ldots \ b_i] \\ 0, & n \notin k_i \end{cases}, \qquad 6$$

where $S_{i,n}$ is the nth element of the ith interferer $S_i$, $(b_i \geq a_i) \in [0 \ldots N-1]$ and $\sigma_i^2 = L_i \overline{\sigma}_i^2/N$, for $L_i = b_i - a_i + 1$, is the frequency domain dual of variance $\overline{\sigma}_i^2$, the power of the ith interferer as sampled in x.

3. There is no restriction on the overlap of interferers. Interferers may overlap fully, partially or not at all. The interference model includes narrowband interferers as well as wideband interferers.

4. The ith interferer $S_i$ is white complex Gaussian distributed with zero mean and autocovariance $C_{S_i S_i} = \sigma_i^2 I$, and $s_i$ is complex Gaussian, bandlimited according to equation 6 with zero mean and autocovariance $C_{s_i s_i} = \langle s_i s_i^H \rangle = D \langle S_i S_i^H \rangle D^H = \sigma_i^2 DW_i D^H = \sigma_i^2 T_i$ where D is the DFT matrix, $W_i$ is a diagonal window matrix such that $$W_i = \mathrm{diag}([W_0 W_1 \ \ldots \ W_{N-1}]), \quad W_n = \begin{cases} 1, & n \in k_i \\ 0, & n \notin k_i \end{cases}, \qquad 7$$

and $T_i$ is a Toeplitz matrix where the first row is the circular sinc function having kth element $$T_{i,1k} = \frac{\sin(\pi k L_i / N)}{\sin(\pi k / N)} \exp(-j\pi k b_i / N). \qquad 8$$

Figure 2:
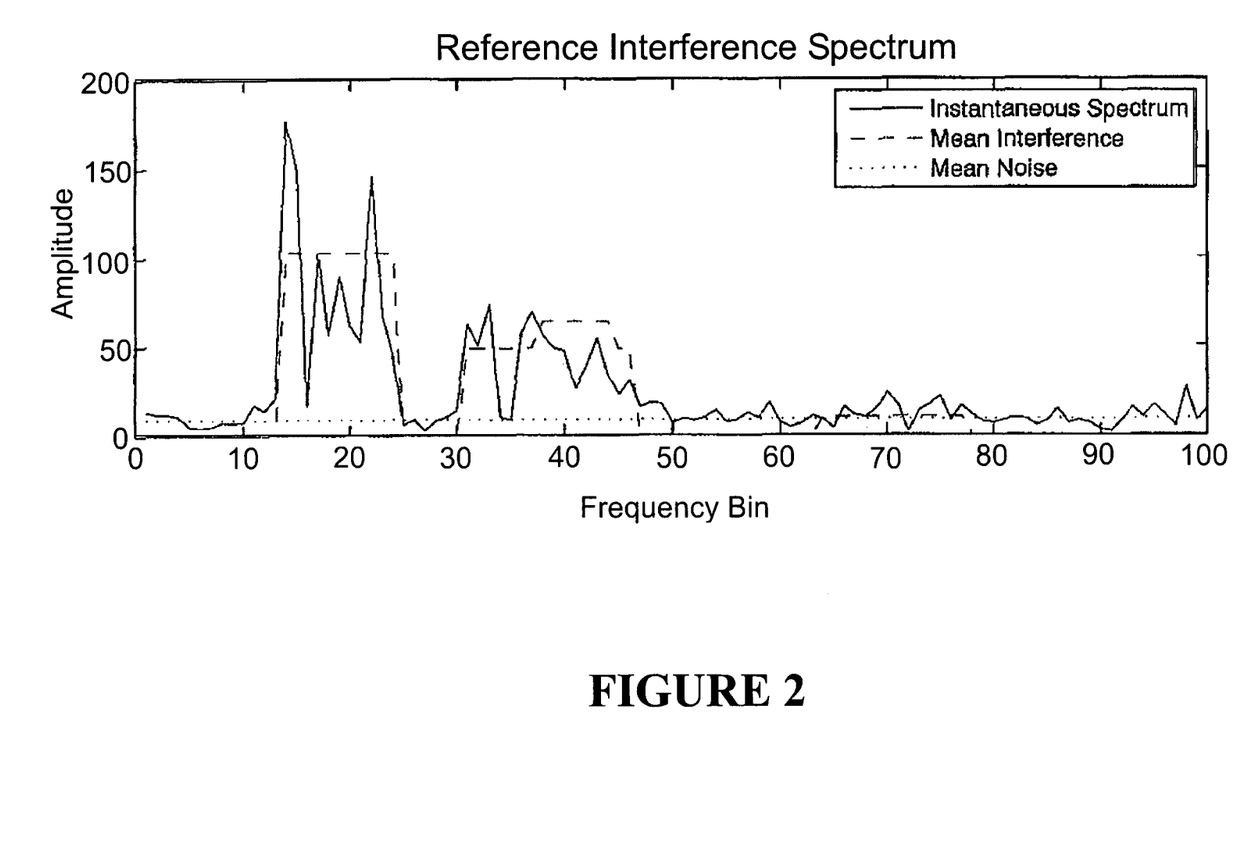
FIG. 2 shows an example of a received interference sample vector spectrum.

FIG. 2 shows the amplitude spectrum of a received sample vector of length N=100 produced using this model. The underlying sample vector was randomly generated and arbitrarily chosen. The dashed line in FIG. 2 shows the time average interference amplitude (root variance) assumed in each frequency bin. In this example, four interferers of varying bandwidths and mean power spectral densities were simulated. One interferer, present in bins 38 to 44, sits entirely within the spectrum of a second interferer. The mean noise amplitude (root variance) per frequency bin is indicated by the dotted line in FIG. 2. Note also that one interferer, present in bins 64 to 77, has a root variance that is almost identical to the noise root variance. In other words this interferer has a mean interference to noise ratio approximately equal to one. In this example both noise and interference per bin were modelled as zero mean independent, identically distributed (iid) complex Gaussian processes having the indicated root variance. It can be seen in this example that the sample vector amplitude in some "interference" bins is quite low even though the mean interference to noise variance ratio is quite large, for example bins 16, 34, and 35. Conversely, the sample vector amplitude in some "noise-only" bins is well above the mean, as is to be expected given the Rayleigh amplitude distribution.

Received signal statistics are developed for two fading channel scenarios. In the Rayleigh fading channel scenario, elements of the channel transfer function matrix for the ith interferer $H_i$ are correlated complex Gaussian random variables. The PDF of $U_{i,n}^R = \text{Re}\{H_{i,nn}S_{i,n}\}$ the real part of an individual, noise-free frequency bin in which interferer i is present, is $$p_U(U_{i,n}^R) = \frac{1}{2\Omega_i} \exp\left(-\frac{U_{i,n}^R}{\Omega_i}\right), \qquad 9$$

where $H_{i,nn}$ is the (nn)th element of the channel transfer function matrix for the ith interferer $H_i$, and $S_i$, is the nth element of $S_i$, $\Omega_i \triangleq \sigma_i \sigma_{H_i}$ for $$\sigma_{H_i}^2 = \frac{1}{2}\langle |H_i|^2 \rangle$$

the power gain of the ith multipath channel. The PDF is the same for the imaginary part of an individual, noise-free frequency bin.

In equation 9, the PDF of the real part of an individual frequency bin in which one or more interferers is present, may be derived by first deriving the first characteristic function of $X_n^R$ $$\Phi_X(\theta) = \prod_{i \in M} \frac{1}{1 + \Omega_i^2 \theta^2} \exp\left(-\frac{1}{2}\sigma_Z^2 \theta^2\right) \qquad 10$$

Therefore, it follows that the PDF of the real part of a frequency bin of the received sample $X_n^R$ is given by $$p_{X1}(X_n^R) = \sum_{i \in M} \exp\left(\frac{\sigma_Z^2}{2\Omega_i^2}\right) \qquad 11$$

$$\frac{\Omega_i}{4 \prod_{\substack{j \in M \\ j \neq i}} (\Omega_i^2 - \Omega_j^2)} \left[ \exp\left(\frac{X_n^R}{\Omega_i}\right) \text{erfc}\left(\frac{\sigma_Z}{\sqrt{2}\,\Omega_i} + \frac{X_n^R}{\sqrt{2}\,\sigma_Z}\right) + \exp\left(-\frac{X_n^R}{\Omega_i}\right) \text{erfc}\left(\frac{\sigma_Z}{\sqrt{2}\,\Omega_i} - \frac{X_n^R}{\sqrt{2}\,\sigma_Z}\right) \right]$$

noting that this also is the PDF of the imaginary part of a frequency bin of the received sample.

$$X_n^I \triangleq \text{Im}\{X_n\} = \text{Im}\left\{\sum_{i \in M} H_{i,nn}S_{i,n} + Z_n\right\}.$$

The joint PDF $$p_{X1}^J(X_n) \triangleq p_{X1}(X_n^R, X_n^I) = p_{X1}(X_n^R) p_{X1}(X_n^I) \qquad 12$$

readily can be evaluated through substitution of equation 11, but the magnitude PDF $$p_{X1}^M(|X_n|) = |X_n| \int_{-\pi}^{\pi} p_{X1}(|X_n|\cos\varphi) p_{X1}(|X_n|\sin\varphi) d\varphi \qquad 13$$

requires numerical integration.

In the Gaussian channel scenario, either line-of-sight conditions exist or otherwise multipath fading is negligible. In this case the channel transfer matrix for the ith interferer is the interferer variance times the identity matrix, for all interferers $H_i = \sigma_i I, \forall i$. The PDF of the real part of the received sample $X_n^R$ reduces to $$p_{X2}(X_n^R) = p_{X2}(X_n^I) = \frac{1}{\sqrt{2\pi\left(\sigma_Z^2 + \sum_{i \in M} \Omega_i^2\right)}} \exp\left(-\frac{(X_n^R)^2}{2\left(\sigma_Z^2 + \sum_{i \in M} \Omega_i^2\right)}\right) \qquad 14$$

In this case, the joint PDF directly can be written as $$p_{X2}^J(X_n) \triangleq p_{X2}(X_n^R, X_n^I) = \frac{1}{2\pi\left(\sigma_Z^2 + \sum_{i \in M} \Omega_i^2\right)} \exp\left(-\frac{|X_n|^2}{2\left(\sigma_Z^2 + \sum_{i \in M} \Omega_i^2\right)}\right) \qquad 15$$

and the magnitude PDF is $$p_{X2}^M(|X_n|) = \frac{|X_n|}{\sigma_Z^2 + \sum_{i \in M} \Omega_i^2} \exp\left(-\frac{|X_n|^2}{2\left(\sigma_Z^2 + \sum_{i \in M} \Omega_i^2\right)}\right) \qquad 16$$

Moments and cumulants of the recovered sample X also are of interest.

For the Rayleigh fading case, from the first characteristic function of the real part of the received sample in the nth bin $X_n^R$, equation 10, the second characteristic function is $$\Psi_X(\theta) = -\sum_{i \in M} \log(1 + \Omega_i^2 \theta^2) - \frac{1}{2}\sigma_Z^2 \theta^2 \qquad 17$$

By exploiting the moment generating property of the first characteristic function, equation 10, and the cumulant generating property of the second characteristic function, equation 17, the first two even order moments ($\mu_2$, $\mu_4$) and cumulants ($\kappa_2$, $\kappa_4$) of $X_n^R$ are $$\mu_2(X_n^R) \triangleq \langle (X_n^R)^2 \rangle = \sigma_Z^2 + \sum_{i \in M} \Omega_i^2 \qquad 18$$

$$\kappa_2(X_n^R) = \sigma_Z^2 + \sum_{i \in M} \Omega_i^2$$

$$\mu_4(X_n^R) \triangleq \langle (X_n^R)^4 \rangle = 3\sigma_Z^4 + 12\sigma_Z^2 \sum_{i \in M} \Omega_i^2 + 24 \sum_{i \in M} \Omega_i^4$$

$$\kappa_4(X_n^R) = 12 \sum_{i \in M} \Omega_i^4$$

The odd order moments and cumulants of $X_R$ are identically zero. The kurtosis of $X_n^R$ is $$\gamma_2(X_n^R) \triangleq \frac{\mu_4}{\mu_2^2} - 3 = \frac{\kappa_4}{\kappa_2^2} = 12 \sum_{i \in M} \frac{\Omega_i^4}{\left(\sigma_Z^2 + \sum_{i \in M} \Omega_i^2\right)^2} \qquad 19$$

For the Gaussian channel case, the first two even order moments and cumulants of the real part of the received sample in the nth bin $X_n^R$ can be found to be $$\mu_2(X_n^R) \triangleq \langle (X_n^R)^2 \rangle = \sigma_Z^2 + \sum_{i \in M} \Omega_i^2 \qquad 20$$

$$\kappa_2(X_n^R) = \sigma_Z^2 + \sum_{i \in M} \Omega_i^2$$

$$\mu_4(X_n^R) \triangleq \langle (X_n^R)^4 \rangle = 3\left(\sigma_Z^2 + \sum_{i \in M} \Omega_i^2\right)^2$$

$$\kappa_4(X_n^R) = 0$$

As above, the odd order moments and cumulants of $X_n^R$ are identically zero. The kurtosis of $X_n^R$ in the Gaussian channel case is zero.

For the noise-only case, where $X^R \equiv \eta^R$, the first four moment and cumulants are identically zero except the second and fourth order moments $\mu_2(Z^R) = \kappa_2(Z^R) = \sigma_Z^2$, and $\mu_4(Z^R) = 3\sigma_Z^4$. The kurtosis of $Z^R$ also is zero.

Common to many detection methods is estimation of the noise variance of the received sample X. This is essentially an initial classification of X into noise and interference, and may be achieved as follows.

First sort X by order of increasing magnitude to produce $\vec{X}$.

Then find $\vec{X}_Z \triangleq [\vec{X}_1 \ldots \vec{X}_{N_Z}]$ the sub-vector of $\vec{X}$ which minimizes distance from Gaussianity, such that $$\hat{N}_Z = \underset{N_Z}{\arg\min} D(\vec{X}_{N_Z}) \qquad 21$$

where $D(\bullet)$ is some measure of Gaussianity, such as kurtosis or the Kolmogorov-Smirnov (K-S) distance. From equation 19, a moment method estimate of kurtosis which serves the purpose of $D(\bullet)$ is $$D_{\gamma_2} \triangleq \hat{\gamma}_2 = \frac{2N_Z \sum_{n=1}^{N_Z} \text{Re}\{X_n\}^4}{\left[\sum_{n=1}^{N_Z} \text{Re}\{X_n\}^2\right]^2} + \frac{2N_Z \sum_{n=1}^{N_Z} \text{Im}\{X_n\}^4}{\left[\sum_{n=1}^{N_Z} \text{Im}\{X_n\}^2\right]^2} - 3 \qquad 22a$$

The K-S distance may be evaluated as $$D_{K-S} \triangleq \max\{|p_Z(\vec{X}_{N_Z} < x) - N_Z/N_Z|\}, \qquad 22b$$

where $p_Z(X < x)$ is the cumulative distribution function (CDF) for dummy variable x and $N_Z \triangleq [1 \ldots N_Z]$.

In general, the K-S distance is more robust then kurtosis as it involves all moments. Kurtosis involves the fourth cumulant (or second and fourth moments) only. In calculating the K-S distance, it is equally valid to evaluate the distance of the real and imaginary parts of X from Gaussian, the distance of the |X| from Rayleigh, or the distance of $|X|^2$ from exponential. Truncated cumulative distribution functions (CDFs) are required to evaluate the K-S test. For data truncated at $T_X = |\vec{X}_{N_Z+1}|$, the truncated Rayleigh CDF is $$p_Z(|X| < x | |X| < T_X) = \frac{1 - \exp(-x^2/(2\sigma_Z^2))}{1 - \exp(-T_X^2/(2\sigma_Z^2))}. \qquad 23$$

Next the noise variance is estimated. To produce the desired result, and in order to evaluate the distance measure $D(\bullet)$, the noise variance is evaluated using a maximum likelihood estimate over truncated data. From equation 23, the variance estimate based on the Rayleigh distribution truncated at $T_X$ requires numerical solution of $$\hat{\sigma}_Z^2 - \frac{T_X}{2}\left[\frac{\exp(-T_X^2/(2\hat{\sigma}_Z^2))}{1 - \exp(-T_X^2/(2\hat{\sigma}_Z^2))}\right] = \frac{1}{2N_Z}\sum_{n=1}^{N_Z} |\vec{X}_n|^2. \qquad 24$$

For each frequency bin the receiver must evaluate which of two hypotheses is most likely. The bin contains noise only or the bin contains noise and interference. Mathematically the hypotheses are expressed as $$\mathcal{H}_0: X_n = Z_n \qquad n \in [1 \ldots N] \qquad 25$$

$$\mathcal{H}_1: X_n = \sum_{i \in M} H_{i,nn} S_{i,n} + Z_n \quad n \in [1 \ldots N].$$

In this equation $M \subseteq [1 \ldots I]$ is the subset of interferers present in the nth frequency bin.

Complicating this problem is that there are an unknown number of different signal models within the received sample X, that is, any given frequency sample $X_n$ can comprise any number of interferers between 0 and I. Thus, over the entire signal spectrum vector X, the hypotheses are that the bin contains noise only, and that the bin contains noise and a set of interferers for all different sets of interferers. Mathematically, the hypotheses are expressed as:

$$\mathcal{H}_0: X = Z \qquad n \in 1 \ldots N \qquad (26)$$

$$\mathcal{H}_1: X = \begin{cases} \sum_{i \in M_0} H_{i,l_0 l_0} S_{i,l_0} + Z_{l_0} & n \in l_0 \\ \vdots \\ \sum_{i \in M_K} H_{i,1_K 1_K} S_{i,1_K} + Z_{1_K} & n \in 1_K \end{cases}$$

In the above equation $M_1 \cup M_2 \cup \ldots \cup M_K = [1 \ldots I]$ index K sets of interferers, $l_i \subset [0 \ldots N-1]$ is a vector of indices of adjacent frequency bins containing an identical number of interferers, nothing that $[l_1 \cup l_2 \cup \ldots \cup l_K] \equiv [k_1 \cup k_2 \cup \ldots \cup k_I]$, and $H_{i,l_i l_i}$ denotes the square diagonal sub-matrix of $H_i$ with rows and columns selected by elements of $l_i$. $l_0$ is the vector of indices of all frequency bins, not necessarily adjacent, containing noise only, and $M_0$ is the empty set of interferers.

Hypothesis probabilities may be compared using the generalized likelihood ratio test (GLRT)

$$L_G(X) = \frac{p_X\left(\begin{array}{c} X \mid \hat{M}_1 \ldots \hat{M}_K, \hat{1}_1 \ldots \hat{1}_K, \hat{\sigma}_Z^2, \\ \hat{C}_{HS_1 HS_1} \ldots \hat{C}_{HS_1 HS_1}, \mathcal{H}_1 \end{array}\right)}{p_Z(X \mid \hat{\sigma}_Z^2, \mathcal{H}_0)} > \Gamma_1 \qquad (27)$$

$$= \max_{M_1 \ldots M_K, 1_1 \ldots 1_K} \frac{p_X(X \mid \hat{\sigma}_Z^2, \hat{C}_{HS_1 HS_1} \ldots \hat{C}_{HS_1 HS_1}, \mathcal{H}_1)}{p_Z(X \mid \hat{\sigma}_Z^2, \mathcal{H}_0)}$$

where $C_{HS_i HS_i}$ is the covariance of $H_i S_i$, $p_X(X|\ldots)$ is the multivariate probability density function (PDF) of X and $p_Z(X|\ldots)$ is the noise PDF. One or more interferers are detected when $L_G(X)$ exceeds threshold $\Gamma_1$. Evaluation of the GLRT numerator requires estimating how many interferers are present, which interferer is present in each frequency bin and the covariance matrix for each interferer. Thus, complexity of equation 27 increases exponentially with I.

Provided interference data is white (interference property 4, above) and the duration of x is less than the channel coherence time (interference property 1, above), it can be shown that $C_{HS_i HS_i}$ is diagonal for $s_i$ produced through any linear modulation, irrespective of any channel conditions additional to the stated assumptions.

For $C_{HS_i HS_i}$ diagonal, $$p_X(X \mid \ldots) = \prod_{n=1}^{N} p_X(X_n \mid \ldots)$$

is simply the likelihood function of the univariate PDF, with dependency on variance not covariance. The GLRT simplifies to $$L_G(X) = \frac{\prod_{n=1}^{N} p_X\left(\begin{array}{c} X_n \mid \hat{M}_1 \ldots \hat{M}_K, \hat{1}_1 \ldots \hat{1}_K, \\ \hat{\sigma}_Z^2, \hat{\Omega}_1^2 \ldots \hat{\Omega}_i^2, \mathcal{H}_1 \end{array}\right)}{\prod_{n=1}^{N} p_Z(X_n \mid \hat{\sigma}_Z^2, \mathcal{H}_0)} > \Gamma_1 \qquad (28)$$

$$= \max_{M_1 \ldots M_K, 1_1 \ldots 1_K} \frac{\prod_{n=1}^{N} p_X(X \mid \hat{\sigma}_Z^2, \hat{\Omega}_1^2 \ldots \hat{\Omega}_i^2, \mathcal{H}_1)}{\prod_{n=1}^{N} p_Z(X_n \mid \hat{\sigma}_Z^2, \mathcal{H}_0)}.$$

Effectively, X now is partitioned into noise-only samples which have estimated variance $\hat{\sigma}_Z^2 < \Gamma_1'$, for some threshold $\Gamma_1'$, and interference plus noise samples which have estimated variance $$\hat{\sigma}_Z^2 + \sum_{i \in M_k} \Omega_i^2 > \Gamma_1'.$$

Pragmatic selection of $\Gamma_1'$ can be made through Monte Carlo methods. For example, balance probabilities of false positive detection (type I error) and false negative detection (type II error) can be found empirically as a function of $\Gamma_1'$ at some interference to noise ratio. For cognitive radio applications, where avoidance of interference may have a higher priority than channel capacity, type I errors may be more acceptable than type II errors and $\Gamma_1'$ can be set accordingly.

Figure 3:
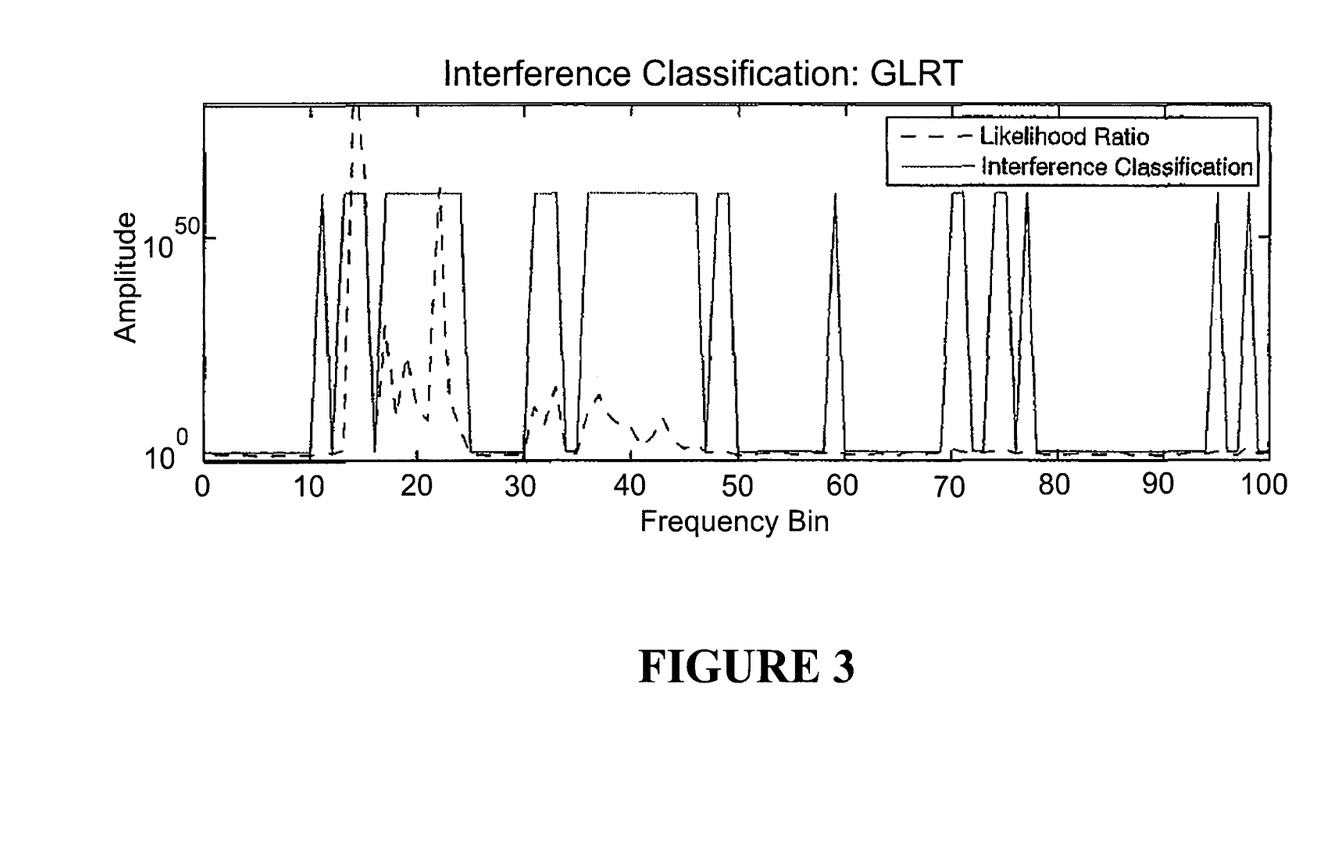
FIG. 3 shows an example of interference classification using the generalized likelihood ratio test on the example interference spectrum of FIG. 2.

The performance of the generalized likelihood ratio test in classifying the reference sample vector spectrum shown in FIG. 2, is shown in FIG. 3. The dashed line in FIG. 3 shows the likelihood ratio in each frequency bin, and the solid line shows the resulting classification such that a classification of zero indicates noise and a non-zero classification indicates signal. The threshold $\Gamma_1'$, was set as one in this example. It can be seen, by comparison of FIGS. 2 and 3, that the GLRT produced a number of type I and type II errors per bin for the reference sample vector.

The generalized likelihood ratio test described by equation 28, without constraints on the number of interferers or the number of sets of interferers, is unable to exploit the assumption that the ith interferer occupies $L_i$ contiguous frequency bins $X_n \ldots X_{n+L_i-1}$. This additional information may be exploited in a formal context by modelling X as an observation sequence vector produced by a hidden Markov process.

Using hidden Markov modelling the state of the nth frequency bin is denoted as $$S_n \epsilon [\mathbb{S}_0 \ldots \mathbb{S}_K] \qquad (29)$$

The state $\mathbb{S}_k$ specifies the set of interferers $M_k$ plus noise and state $\mathbb{S}_0$ contains only noise, recalling that $M_0$ is the empty set of interferers. Also implicit is that an interferer belonging to a set of interferers $i \epsilon M_k$ has variance $\Omega^2$, thus state $\mathbb{S}_k$ implies variance $$\sigma_Z^2 + \sum_{i \in M_k} \Omega_i^2.$$

The observation probability for $X_n$ in state $\mathbb{S}_k$ is $$P_k(X_n) \triangleq p(X_n \mid S_n = \mathbb{S}_k) = p_X(X_n \mid M = M_k), \qquad (30)$$

where $p_X(X)$ is given in equation 11. A set of N observation probabilities is denoted $P \triangleq [P_k(X_n)]$ for n=1 . . . N and the initial state distribution is denoted $I \triangleq [p(S_1 = \mathbb{S}_k)]$ for k=1 . . . K. An essential feature of this model is the transition probability between states $$T_{lk} \triangleq p(S_{n+1} = \mathbb{S}_k | S_n = \mathbb{S}_l), \qquad 31$$

The posterior transition probabilities are $$\mathcal{T}_{lk} = \begin{cases} (R^{1_l} - 1)/R^{1_l}, & k = l \\ 1/R^{1_l}, & k = m \\ 0, & k \neq l, m \end{cases}$$

where $R^{l_t}$ denotes the vector space, or number of elements, in $l_t$, introduced in equation 26, and m is defined by the posterior state assignments $S_{n-R^t+1} = S_{n-R^t+2} = S_n \mathbb{S}_l$, $S_{n+1} = \mathbb{S}_m$ for the state sequence [ . . . $S_{n-R^t+1}, S_{n-R^t+2}, S_n, S_{n+1}$ . . . ]. A set of N transition probabilities is denoted $T \triangleq [T_{lk}]$ for l,k=0 . . . K. The output of defining the hidden Markov model for sample vector X is a state sequence $S \triangleq S_1, S_2, \ldots, S_N$ describing whether each frequency domain sample $X_n$ is best classified as noise, $S_n = \mathbb{S}_0$, or interference $S_n \in [\mathbb{S}_1 \ldots \mathbb{S}_K]$. This is achieved by finding the set of model parameters [T,P,I] which maximise p(X|T,P,I).

The following sequential process describes one possible implementation for how the HMM described above can be used to estimate state sequence S.

First the noise variance is estimated. This is achieved by applying the method described previously.

Next a normal interference variance is produced. To be able to evaluate $P_k(X_n)$, it is necessary to estimate interference variance. However, at this point in the process, it is not known how many interferers, if any, are present. Explicit estimation of variance for individual interferers is problematic. Further, estimation of variance for composite interference is of little value as this will tend produce an estimate dominated by any large interferers, leading to undesirable type II (false negative detection) errors for low power interferers. One means of reducing this problem is to produce a nominal interference variance by defining an acceptable type I (false positive detection) error threshold, that is, in absence of any explicit interference estimation. For example, a nominal interference variance $$\hat{\sigma}_I^2 \triangleq r\hat{\sigma}_I^2 \qquad 33$$

will produce a type I error for any noise sample for which $$|X_n|^2 > 2\hat{\sigma}_Z^2 \frac{r}{r-1} \log r.$$

Now an initial classification is performed by estimating the hidden Markov model. To initialise the state sequence S, the two state set [$\mathbb{S}_0, \mathbb{S}_1$] is considered, where $\mathbb{S}_0$ is the noise state and $\mathbb{S}_1$ is the interference state. The observation probabilities P are evaluated using $$P_0(X_n) = p_Z(X_n) \qquad 34$$

for some noise PDF $p_Z(\cdot)$, such as one of equations 3, 4 or 5, and $$P_1(X_n) = p_X(X_n)|_{M=[1], \sigma_1 = \hat{\sigma}_1}, \qquad 35$$

for some interference-plus-noise PDF $p_X(\cdot)$, such as one of equations 11, 12, 13, 14, 15 or 16. Equation 15 can be used to produce $P_1$ for the Gaussian channel model. The set of transition probabilities T is initialised using some nominal $\tau_0$, such that $T_{01} = T_{10} = 1/\tau_0$, $T_{00} = T_{11}(\tau_0-1)/\tau_0$, $\forall n = 1 \ldots N$. The initial value for the state sequence S is $$S = \underset{S}{\operatorname{argmax}}\, p(X|S, \mathcal{P}, \mathcal{T}, \mathcal{I}) p(S|\mathcal{P}, \mathcal{T}, \mathcal{I}) \qquad 36$$

which may be produced efficiently by applying the Viterbi algorithm [28] to X with P, T as above $I=[P_0(X_1), P_1(X_1)]$. Complexity is set by the Viterbi algorithm window/traceback length.

A final classification is now performed by estimating the hidden Markov model. A first estimate of the actual number of interferers now can be made by sorting the K sub-sequences of S, with length $R^{l_k}$, k∈[1 . . . K], for which $S_{n-R^k+1} = S_{n-R^k+2} = \ldots = S_n = \mathbb{S}_1$ by order of increasing variance. The K ordered sub-sequences now are reclassified as belonging to $\mathbb{S}_1 \ldots \mathbb{S}_K$, the estimated variance for each interferer in state $\mathbb{S}_k$ is required to define $P_k(X_n)$. Finally, the state sequence S then may be updated for the expanded state set [$\mathbb{S}_0 \ldots \mathbb{S}_K$], again by evaluating 36 using the Viterbi algorithm. Interference is detected if $S_n \neq \mathbb{S}_0$ for any n∈[0 . . . N−1].

The state sequence S may be updated by again applying equation 36 for the updated hidden Markov model parameters using, for example, the Viterbi algorithm. This process can be iterated to improve classification reliability. One iteration empirically was observed to achieve good results in achieving the two state classification goal of classifying frequency bin samples as being either noise or interference plus noise.

Figure 4:
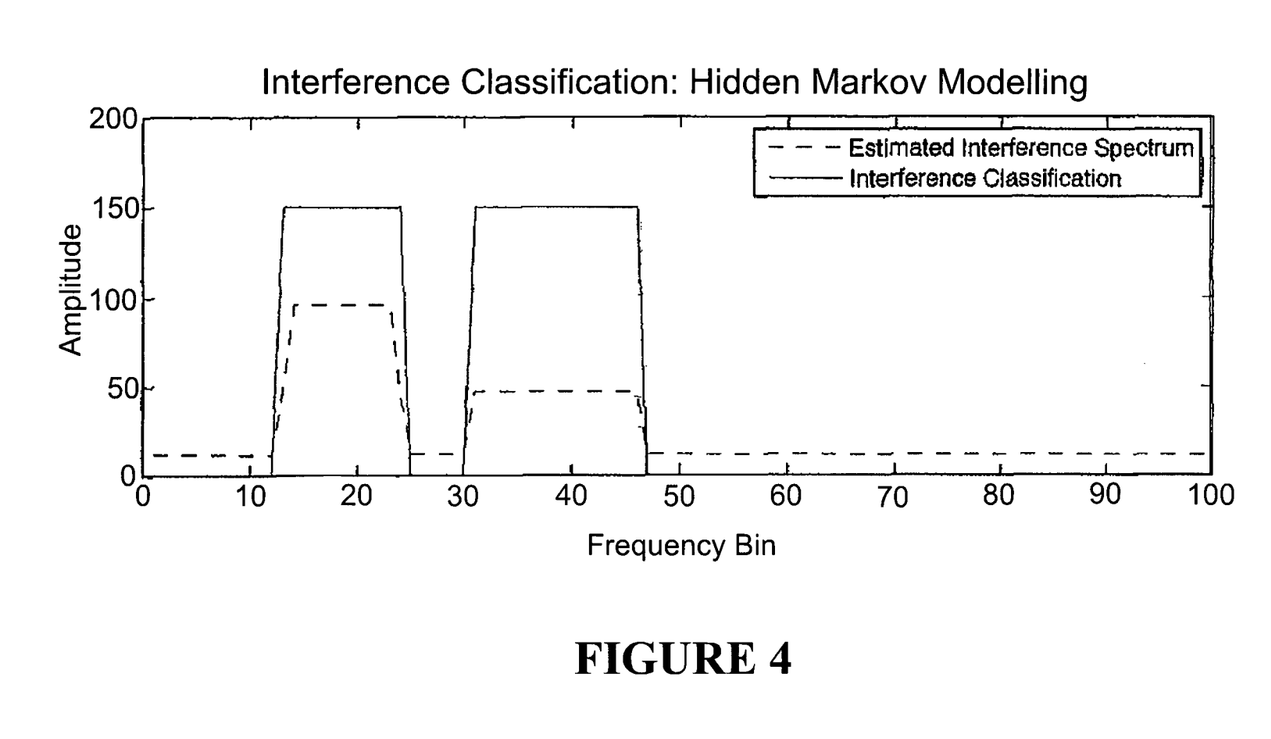
FIG. 4 shows an example of interference classification using the method of the invention on the example interference spectrum of FIG. 2, FIGS. 5A and 5B are graphs showing the detection performance of several different wideband detection methods.

FIG. 4 shows the hidden Markov model performance in classifying the reference sample vector spectrum shown in FIG. 2. The solid line in FIG. 4 shows the classification output of the second pass such that a classification of zero indicates noise and a non-zero classification indicates signal. The dashed line in FIG. 4 indicates the estimated means interference amplitude resulting from the classification and the associated state sequence. It can be seen, by comparison of FIGS. 2 and 4, that the hidden Markov model performed well in classifying the higher power interferers, but failed to detect the low power interferer occupying bins 64 through to 77 of the reference sample vector spectrum.

To estimate the probability of type I and type II errors as a function of signal-to-interference ratio (INR), and in order to set threshold parameters for the various methods, repeated detection trials were performed for a single, standard interferer. The size of the received signal vector was to set N=100, and the interferer was bandlimited to 20% of the received signal bandwidth with a low-pass-equivalent carrier frequency of zero. Thus, from equation 1, I=1 and, from equation 6, L=20, a=41 and b=60. The interferer was generated as being IID complex Gaussian in each frequency bin in $k_1$. Results for each method as a function of INR were obtained by averaging the performance of 1000 detections.

For each method, a family of results for probabilities of type I and type II errors as functions of INR was produced for different values of the respective threshold parameter. The threshold parameter value for which the probability of type I and type II errors was most similar at an INR of 3 dB, given in table I, then was used to produce the comparative results shown in FIGS. 5a and 5b.

TABLE I

Optimum threshold parameter for each classification method, being that value for which the probabilities of type I and type II errors were most similar for a standard interferer at INR of 3 dB.

| Method | Optimal Threshold Parameter Value |
| --- | --- |
| Generalized log likelihood ratio test | $\Gamma_1 = 0.6$ |
| Hidden Markov modelling | $r = 6.25, \tau_0 = 10$ |
| Power Spectrum I | $\Gamma_z = 0.6$ |
| Power Spectrum II | $\Gamma_z = 0.6$ |
| MUSIC/Eigenanalysis | $\Gamma_z = 0.3$ |

Figure 5A:
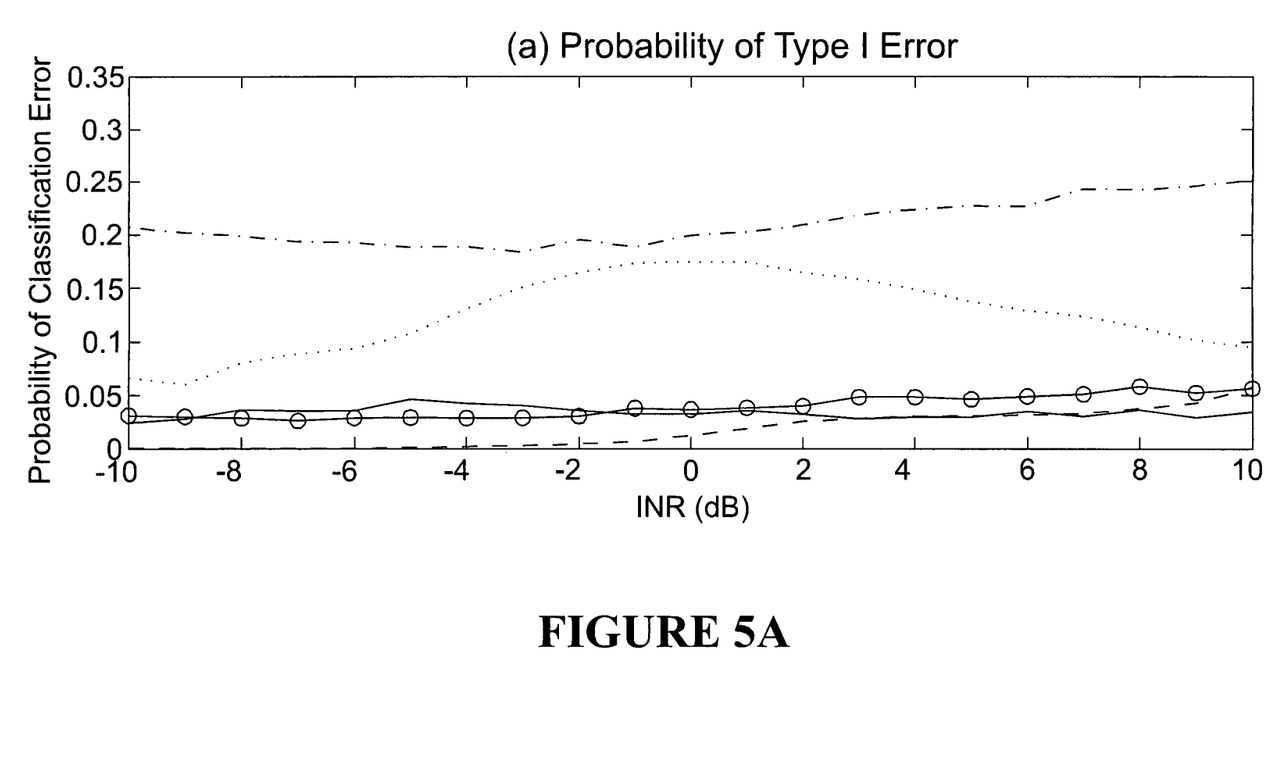
Figure 5B:
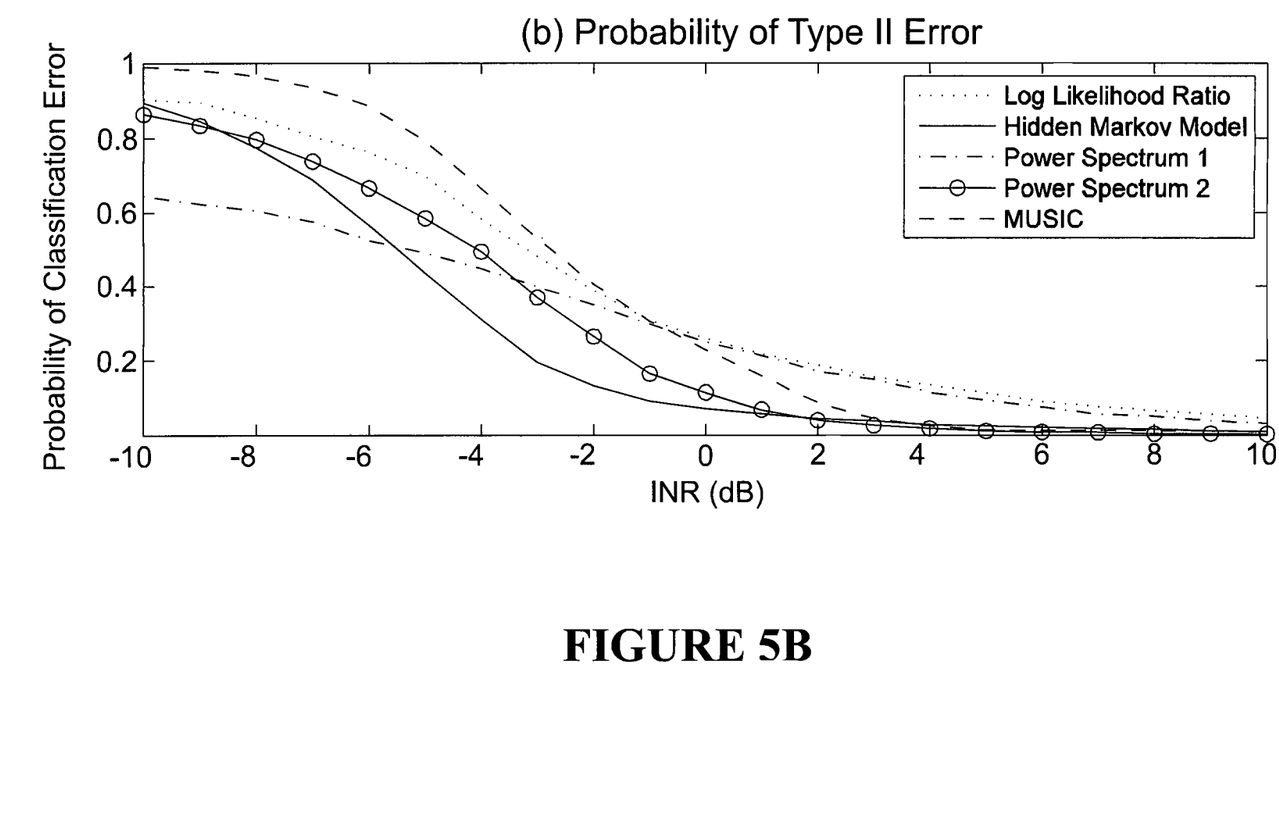

FIGS. 5a and 5b show detection performance, in particular the probability of classification error per frequency bin averaged over 1000 trials for a N=100 length sample vector. One standardized interferer occupying 20% of the receiver input bandwidth was used for all simulations. The legend in (b) applies to both FIGS. 5a and 5b. For each method, the observed probability of type I errors is shown in (a) and the observed probability of type II errors is shown in (b).

FIG. 5a indicates that the methods producing the lowest $$\sum_{n=1}^{N} p_{TypeI}(\mathcal{H}_1 | X_n, \mathcal{H}_0)$$

at all INRs were HMM, Power Spectrum 2 and MUSIC. FIG. 5b indicates that the methods producing the lowest $$\sum_{n=1}^{N} p_{TypeII}(\mathcal{H}_0 | X_n, \mathcal{H}_1)$$

were HMM and Power Spectrum II with HMM performing best at low INR. MUSIC produced the most type II errors. HMM and Power Spectrum II produced the lowest average probability of classification error, with HMM being the best performed overall.

A more rigorous performance assessment of the detection methods was performed by simulating four wideband interferers with random and unknown parameters. Each interferer bandwidth was randomly chosen between 0% and 20% of the receive bandwidth, with a low-pass-equivalent carrier frequency uniformly randomly distributed between −0.8 and +0.8 of the sample frequency. The INR for each interferer was uniformly randomly distributed in decibels between −10 dB and +10 dB. Interferers were generated as being IID complex Gaussian in each frequency bin in $k_1$ for each i. Classification errors were recorded for each length 100 sample vector and averaged over 100,000 detections for each method.

Figure 6A:
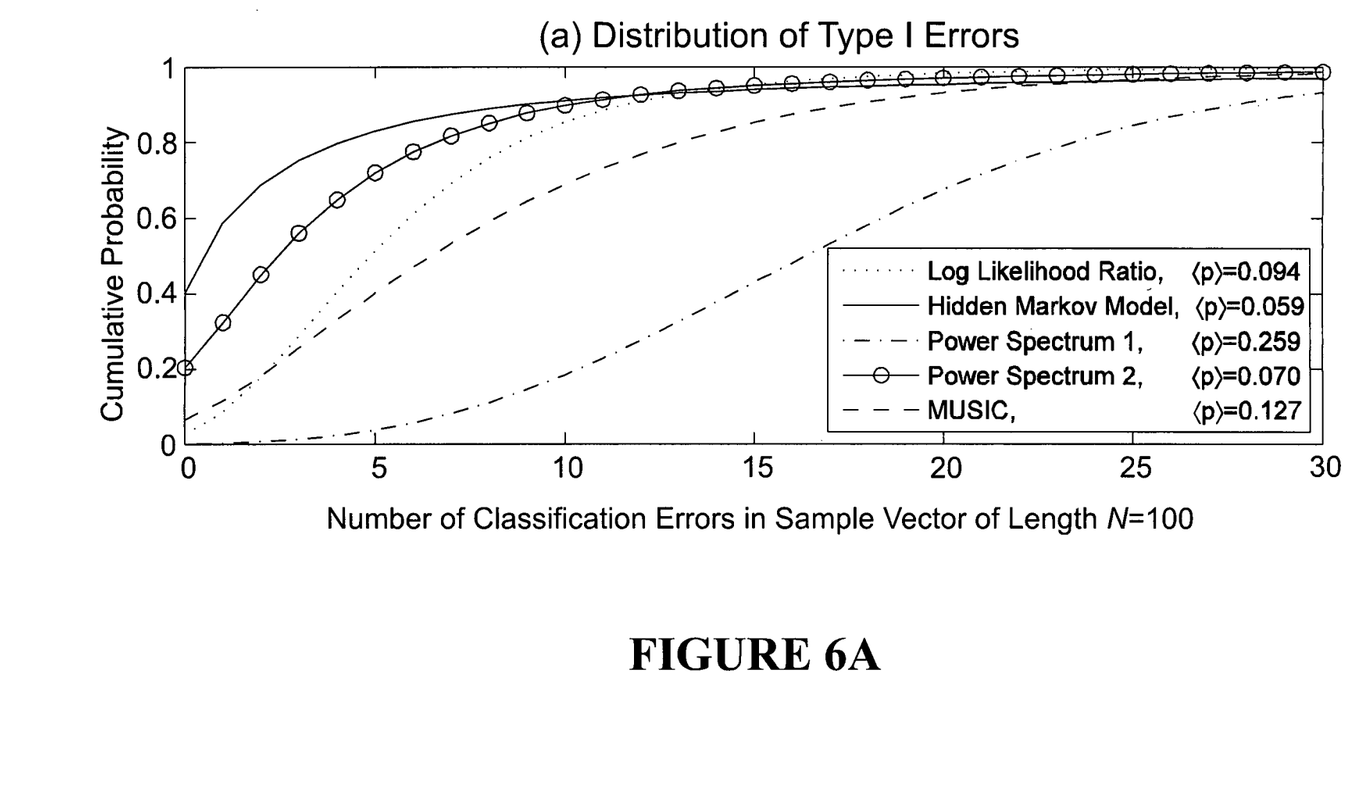
FIGS. 6A and 6B are graphs showing the detection performance of several different wideband detection methods.
Figure 6B:
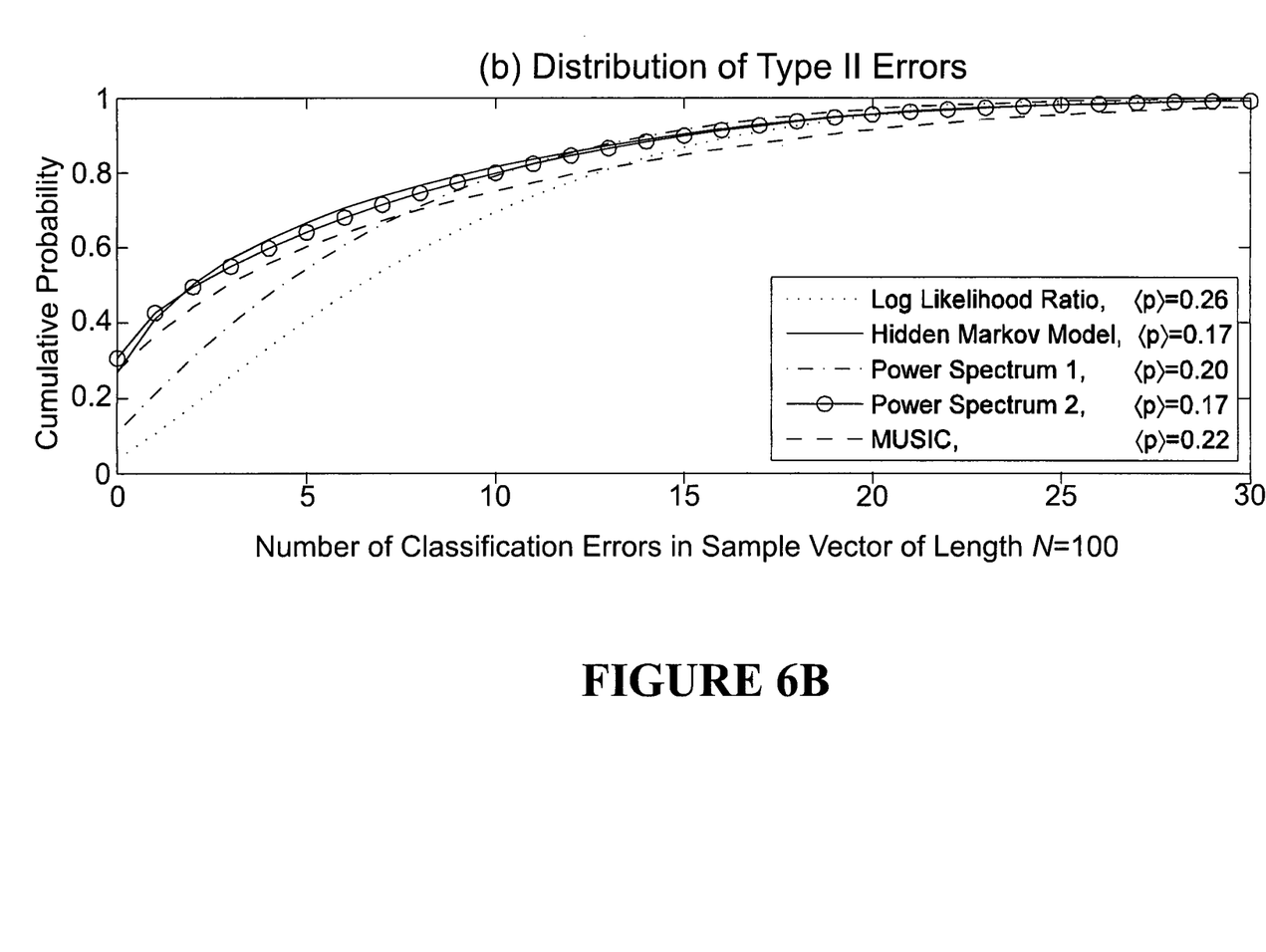

FIGS. 6a and 6b show the low INR detection performance, in particular the distribution of classification errors for an N=100 length sample vector aggregated from 100,000 trials. Four interferers of random bandwidth, power and demodulated carrier frequency were used in each simulation, with INRs uniformly distributed over the range −10 dB to +10 dB. Each legend also indicates the ensemble probability of classification error. For each method; the observed distribution of type I errors is shown in (a) and the observed distribution of type II errors is shown in (b).

FIG. 6a shows that HMM produced the least type I errors, while FIG. 6b shows that HMM and Power Spectrum 2 produced the least type II errors. FIG. 6b shows that all methods produced relatively high numbers of type II errors, reflecting the inherent difficulty in detecting interferers having INRs of less than 0 dB. Overall, these results confirm HMM to be the most robust method, although the performance improvement over Power Spectrum 2 is not that great. The performance of all methods was found to improve with increasing INR.

The simulation results show that all of the methods trialled exhibited relatively high probabilities of producing classification errors averaged over the INR range. Most problematic for each method was the common case of a sample vector in which the instantaneous power spectral density (PSD) at either edge of an interferer passband was substantially lower than the noise PSD for that sample vector. For cognitive radio applications, where prevention of interference is paramount, inclusion of a "guard band" around each detected interferer would mitigate against the risk of interference resulting from a type II error, at the expense of increasing the probability of a type I error. Increasing the length of the sample vector and using more than one sample vector to make the detection decision also would improve performance of all methods.

Figure 7:
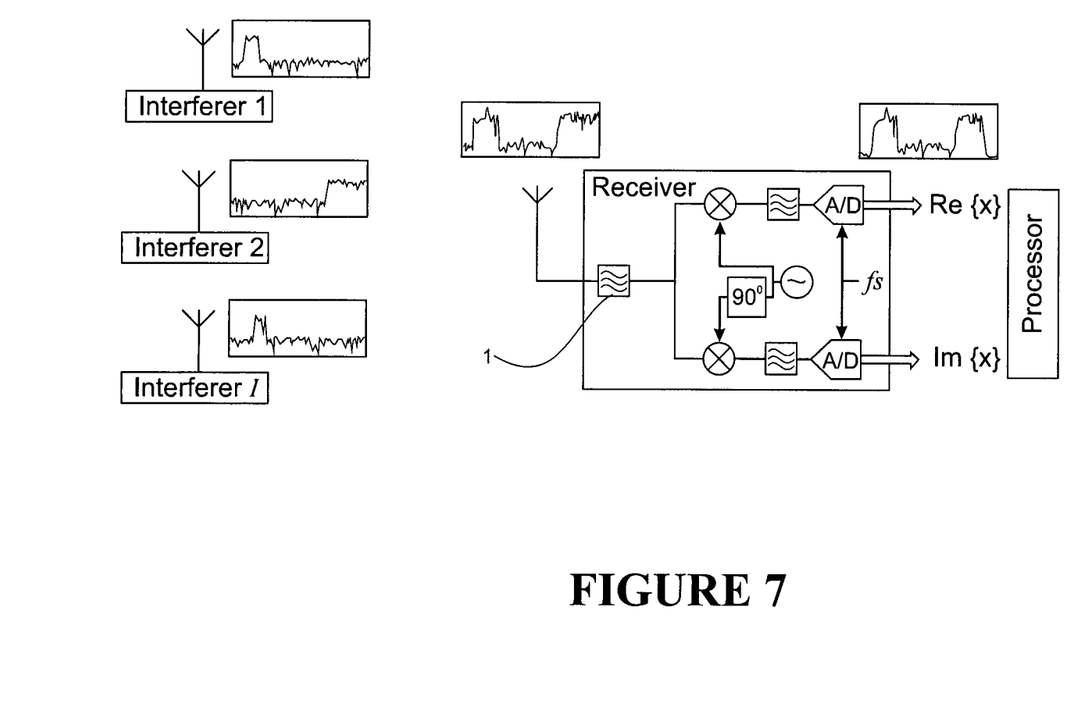
FIG. 7 shows a receiver.

FIG. 7 shows a receiver system showing a standard receiver front end and a processor arranged to detect interference in accordance with the invention. The signal received by the receiver is band limited to the approximate desired signal band width B by band pass filter 1. The band limited signal is then converted to base band and complex samples are contained at a rate $f_s \geq B$ sufficient to present a lessening of the desired signal. The signal then passes to a processor arranged to detect interference. The processor can be switched in or out of the circuit so that it is only able to detect interferes in a signal free period. This period may be N sample inter-frame space. In the first step of the process of the noise variance estimated. Firstly the sample can be Fourier transformed using a discrete Fourier transform matrix. The sample can then be sorted by order of increasing magnitude to produce a magnitude vector. A sub-vector from the magnitude vector is then found that minimises the distance from either the real of imaginary parts of the vector, the distance of the modulus of the vector from Rayleigh or the distance of the modulus squared from exponential. Once the sub-vector is found the voice variance is evaluated using a maximum likelihood estimate over the sub vector. After the noise variance is estimated, a nominal interference value is produced and then an initial classification is produced by estimating the hidden Markov model. The initial classification using the hidden Markov model can be performed using equations 34, 35 and 36. After the initial classification is performed a final classification is performed. This process can be iterated to improve reliability. Once interferers have been detected then the receiver can act to cancel the interferers.

When the detection system is implemented in a transmitter, the transmitter can detect any interferers and then transmit at frequencies not occupied by interferers. Likewise the receiver can upon detection of interferers only decode signals from bins not occupied by interferers if the transmitter is not set up in the corresponding manner.

The foregoing describes the invention including preferred forms thereof. Alterations and modifications as will be obvious to those skilled in the art are intended to be incorporated in the scope of the invention as defined by the accompanying claims.

The invention claimed is:

1. A method of detecting unknown wideband interference, the method implemented by a blind radio receiver having a processor that is configured to carry out the steps of: receiving a sample vector X of noise and interference, finding a set of parameters that maximise p(X|T, P, I), where T is the transition probability between states, P is the observation probability and I is the initial state, and wherein the step of finding the set of parameters that maximise p(X|T, P, I), includes a step of estimating noise variance, determining an optimal state sequence from the set of parameters, and determining wideband interference from the optimal state sequence.

2. The method according to claim 1 wherein the step of estimating noise variance comprises receiving a sample vector of noise and interference, sorting the sample vector in the frequency domain by order of increasing magnitude to produce an ordered vector, finding a sub-vector of the ordered vector that minimises the distance from a noise measure, and estimating the noise variance, wherein both the noise and interference are zero mean.

3. The method according to claim 1 wherein the step of finding a set of parameters that maximise p(X|T, P, I) further comprises the steps of producing a nominal interference variance and initialising the optimal state sequence based on the nominal interference variance.

4. The method according to claim 3 wherein the nominal interference variance is $\hat{\sigma}_I^2 \triangleq r\hat{\sigma}_Z^2$ where $\hat{\sigma}_I^2$ is the nominal interference variance, r is a threshold value and $\hat{\sigma}_Z^2$ is the noise variance.

5. The method according to claim 1 wherein the optimal state sequence is found as $$S = \underset{S}{\mathrm{argmax}}\, p(X|S, P, T, I)p(S|P, T, I).$$

6. The method according claim 1 wherein the optimal state sequence is produced using the Viterbi algorithm.

7. The method according to claim 2 wherein the sub-vector is found as $\hat{\vec{X}}_Z \triangleq [\vec{X}_1 \ldots \vec{X}_{N_Z}]$ where $\hat{\vec{X}}_Z$ is the sub-vector and $\vec{X}_1 \ldots \vec{X}_{N_Z}$ are elements of the sub-vector.

8. The method according to claim 2 or claim 7 wherein the sub-vector is found as the vector that minimises the distance from Gaussianity, such that $\hat{N}_z = \mathrm{argmin}_{N_Z} D(\vec{X}_{N_Z})$ where D(•) is some measure of Gaussianity.

9. The method according to claim 8 wherein the measure of Gaussianity is kurtosis.

10. The method according to claim 8 wherein the measure of Gaussianity comprises a Kolmogorov-Smirnov distance.

* * * * *